(12) United States Patent
Yang

(10) Patent No.: US 7,184,460 B2
(45) Date of Patent: Feb. 27, 2007

(54) SPREAD SPECTRUM COMMUNICATION SYSTEM WITH AUTOMATIC RATE DETECTION

(75) Inventor: George L. Yang, 4628 Kings Mill Way, Owings Mills, MD (US) 21117

(73) Assignee: George L. Yang, Owings Mills, MD (US)

( * ) Notice: Subject to any disclaimer, the term of this patent is extended or adjusted under 35 U.S.C. 154(b) by 743 days.

(21) Appl. No.: 10/180,188

(22) Filed: Jun. 26, 2002

(65) Prior Publication Data

US 2004/0001534 A1    Jan. 1, 2004

(51) Int. Cl.
*H04B 1/69* (2006.01)

(52) U.S. Cl. .................. 375/143; 375/130; 370/320; 398/77

(58) Field of Classification Search .............. 375/143, 375/130, 140, 141, 148, 222; 370/335, 347; 455/234
See application file for complete search history.

(56) References Cited

U.S. PATENT DOCUMENTS

| | | | | |
|---|---|---|---|---|
| 4,390,947 A | * | 6/1983 | DeShon | 710/60 |
| 4,924,516 A | * | 5/1990 | Bremer et al. | 380/46 |
| 5,124,955 A | * | 6/1992 | Jackson et al. | 367/134 |
| 5,889,815 A | * | 3/1999 | Iwakiri | 375/148 |
| 6,018,650 A | * | 1/2000 | Petsko et al. | 455/234.1 |
| 6,094,428 A | * | 7/2000 | Bruckert et al. | 370/335 |
| 6,324,209 B1 | * | 11/2001 | Li et al. | 375/146 |

* cited by examiner

*Primary Examiner*—Mohammed Ghayour
*Assistant Examiner*—Adolf DSouza

(57) ABSTRACT

A multi-channel direct sequence spread-spectrum communication system with the capability of automatic rate detection consists of a plurality of signal channels and a plurality of data channels. During signaling period, only the signaling channels corresponding to the desired symbol repetition and the data channels corresponding to the highest index among the indexes of all active data channels will be allowed to transmit. During data transmission period, only the active data channels will be allowed to transmit. Receiver will use the information provided in preamble signal and mid-amble signal to obtain the number of symbol repetition, the set of active data channels and etc, and to set up initial synchronization.

20 Claims, 5 Drawing Sheets

SPREAD SPECTRUM COMMUNICATION SYSTEM WITH AUTOMATIC RATE DETECTION

FEDERALLY SPONSORED RESEARCH

Not Applicable

SEQUENCE LISTING OR PROGRAM

Not Applicable

FIELD OF THE INVENTION

The invention is generally related to a communication system, more particularly related to a multi-channel direct sequence spread spectrum communication system with the capability of automatic data rate detection.

BACKGROUND

A spread spectrum communication system is such a system that transmission bandwidth is substantially higher than data rate. In a direct sequence spread spectrum communication system, at transmitter side, a data sequence is modulated by a pseudo random chip sequence to generate spread spectrum signal. Usually the chip rate of the pseudo random sequence is much higher than the rate of the data sequence, resulting in the spread spectrum signal having significant wider bandwidth than that of the data sequence itself. The spread spectrum signal is then transmitted over a communication media to a receiver. At the receiver side, the received spread spectrum signal is multiplied by a local pseudo random chip sequence to despread and recover the contained information.

Having many advantages over other communication systems, direct sequence spread spectrum communication system is one of the major communication systems widely used in today's society. However, regular direct sequence spread spectrum communication system has some disadvantages. One of the major disadvantages is low spectrum efficiency. Nowadays more and more applications require higher and higher data rate but the available bandwidth is both very expensive and limited. The low spectrum efficiency in a regular direct sequence spread spectrum communication system will greatly restrict its opportunity to be used in many high data rate applications.

Multi-channel direct sequence spread spectrum communications system is one of the attempts to increase data rate and therefore to improve the spectrum efficiency of direct sequence spread spectrum communication system. Basically, a multi-channel direct sequence spread spectrum communication system transmits a set of spreading signals simultaneously over a given frequency bandwidth.

Beside high spectrum efficiency, a communication system is also expected to be able to provide different data rates to meet various transmission requirements, which are determined by various applications and by different transmission environments.

In today's society, there are many different transmission applications such as transmitting voice, sending short text message, making video conference call, downloading files from internet, emailing photos to friend and watching movie. Usually different application requires different transmission rates. A good communication system should be able to provide many different transmission rates to meet the requirements of different applications.

Different transmission environments also require a communication system, especially a wireless communication system, to have different data rates. When transmission condition is good, such as a mobile station is close to a base station, it may be desirable for a communication system to transmit message with higher data rate. When transmission condition deteriorates, such as a mobile station is far away from a base station, or there is a serious fading, it may be attractive for a communication system to transmit message with lower data rate in order to have reliable communication.

A multi-channel communication system has the inborn capability to support many different data rates. To have different rates, a multi-channel communication system can simply use part of its channels for data transmission and prevent the rest channels from transmitting. For example, if only one channel is used for data transmission and the rest channels are shut off, then one data rate can be provided. If two channels are used for data transmission and the rest channels are shut off, then another data rate can be provided. If symbol repetitions are allowed, more data rates can be provided. The combinations of different number of active channels and different number of symbol repetitions can result in many different data rates.

Usually, a receiver is informed the change of data rate by a transmitter through upper layer of protocol, which not only costs the capacity of a communication system, but also cause overall delay. In a packet-switched communication system, the packet received could come from total different source than the previous one and therefore generally there is no any relation between two adjacent packets. When data rate is high and transmission environment changes rapidly, the delay could cause a receiver of a packet-switched communication system having no enough time to decode the intended data rate and therefore unable to correctly demodulate.

Therefore, there is a need to provide a mechanics for a receiver in a multi-channel direct sequence spread spectrum communication system to automatically detect the data rate set up by a transmitter.

SUMMARY OF INVENTION

The primary objective of the invention is to make a multi-channel direct sequence spread-spectrum communication system to have the capability to automatically detect the data rates.

Another objective of the invention is to provide a signal structure for a preamble signal so that a multi-channel direct sequence communication system can detect transmission data rate automatically, search for multi-paths, and make initial synchronization.

Another objective of the invention is to provide a signal structure for a mid-amble signal so that a multi-channel direct sequence communication system can detect the change of transmission data rate automatically, update multi-path information, disable weak path, and establish new strong path.

Another objective of the invention is to provide method so that a multi-channel direct sequence communication system can be more flexible in changing transmission data rate without resorting to upper layers nor interrupting communication.

BRIEF DESCRIPTION OF THE DRAWINGS

The drawing figures depict preferred embodiments of the present invention by way of examples, not by way of limitations. In the figures, like reference numerals refer to the same or similar elements.

DETAILED DESCRIPTION OF THE PREFFERED EMBODIMENTS

Detailed description of the preferred embodiments is provided herein. The embodiments illustrate multi-channel direct sequence spread spectrum communication systems with the capability to automatically detect transmission data rates. However, it is to be understood that the present invention may be embodied in many different ways. For those skilled in the art, it could be easy to modify the embodiments. For example, instead of using a 16-ary phase-shift keying (PSK) phase mapping device, one can use a mapping device related to M-ary PSK, M-ary quadrature amplitude modulation (QAM) or M-ary pulse amplitude modulation (PAM). Therefore, specific details disclosed are not to be interpreted as limitations, but rather as bases for the claims and as representative bases for teaching one to employ the present invention in virtually any appropriately detailed system, structure or manner.

Figure 1:
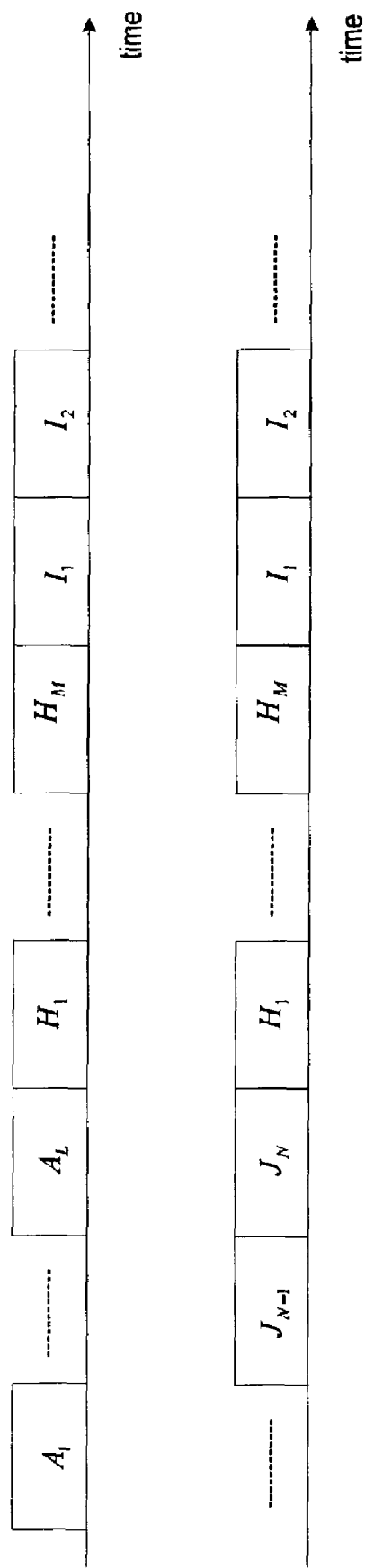
FIG. 1 is a diagram of the transmissions around a preamble signal and a mid-amble signal.

The top diagram in FIG. 1 shows the beginning of a transmission. At the beginning of each transmission, there are L symbol periods $A_i, i=1, \ldots, L$ dedicated for setting up AGC. The number L should be big enough so that when the received signal strength is in design range, in L symbol periods, the receiving amplifier should bring the amplified signal into operational range. Immediately after the L symbol periods, there are M symbol periods $H_j, j=1, \ldots, M$ dedicated for signaling. The signal transmitted during these M symbol periods can be used not only to detect the intended transmission rate, but also to search for multi-paths and to build initial synchronization. After the M symbol periods, there are many symbol periods $I_k, k=1, \ldots$, dedicated for data transmission.

The bottom diagram in FIG. 1 shows the conjunction between two transmissions. There are N symbol periods $J_k, k=1, \ldots, N$ dedicated for a previous data transmission. After the N symbol periods, there are M symbol periods $H_j, j=1, \ldots, M$ dedicated for signaling. Also the signal transmitted during these M symbol periods can be used not only to detect the new transmission rate, but also to update the information about multi-paths and to set up initial synchronization for new links. The transmission data rate provided in these M symbol periods makes a communication system be able to change the transmission data rate without interrupting communication nor resorting to upper layers of a protocol. After the M symbol periods, there are many symbol periods $I_k, k=1, \ldots$, dedicated for data transmission.

The number M should be big enough so that the energy accumulated through M symbol periods on each active channel is equal to or larger than the energy accumulated by each of the active data channels during normal data transmission.

For easy to describe, it may be worthwhile to define some terms. Any of these L symbol periods for setting up AGC is called an AGC period and any of these M symbol periods for signaling is called a signaling period. If the signal generated by various channels during these M signaling periods is around the beginning of a transmission, the signal will be called preamble signal. If the signal generated by various channels during these M signaling periods is between two transmissions, it will be called mid-amble signal. Any symbol period represented by $I_k$ or $J_k$ is called a data period.

More terms can be defined for simplicity. A symbol transmitted by a channel in an AGC period is called an AGC symbol and the symbols transmitted by all active channels in an AGC period is called a multi-channel AGC symbol. Similarly, a symbol transmitted by a channel in a signaling period is called a signaling symbol and the symbols transmitted by all active channels in a signaling period is called a multi-channel signaling symbol. Further, a signaling symbol generated by a signaling channel is called a dedicated signaling symbol. In a similar way, a symbol transmitted by a channel in a data period is called a data symbol and the symbols transmitted by all active channels in a data period is called a multi-channel data symbol. The symbols transmitted by all active channels in a symbol period are called a multi-channel symbol.

A channel active during AGC periods is called an AGC channel and all of the channels active during AGC periods is called a multi-channel AGC channel or active AGC channels for short. Similarly, a channel active during signaling periods is called a signaling channel and all of the channels active during signaling periods is called a multi-channel signaling channel or active signaling channels for short. In a similar way, a channel active during data periods is called a data channel and all of the channels active during data periods is called a multi-channel data channel or active data channels for short.

Figure 2:
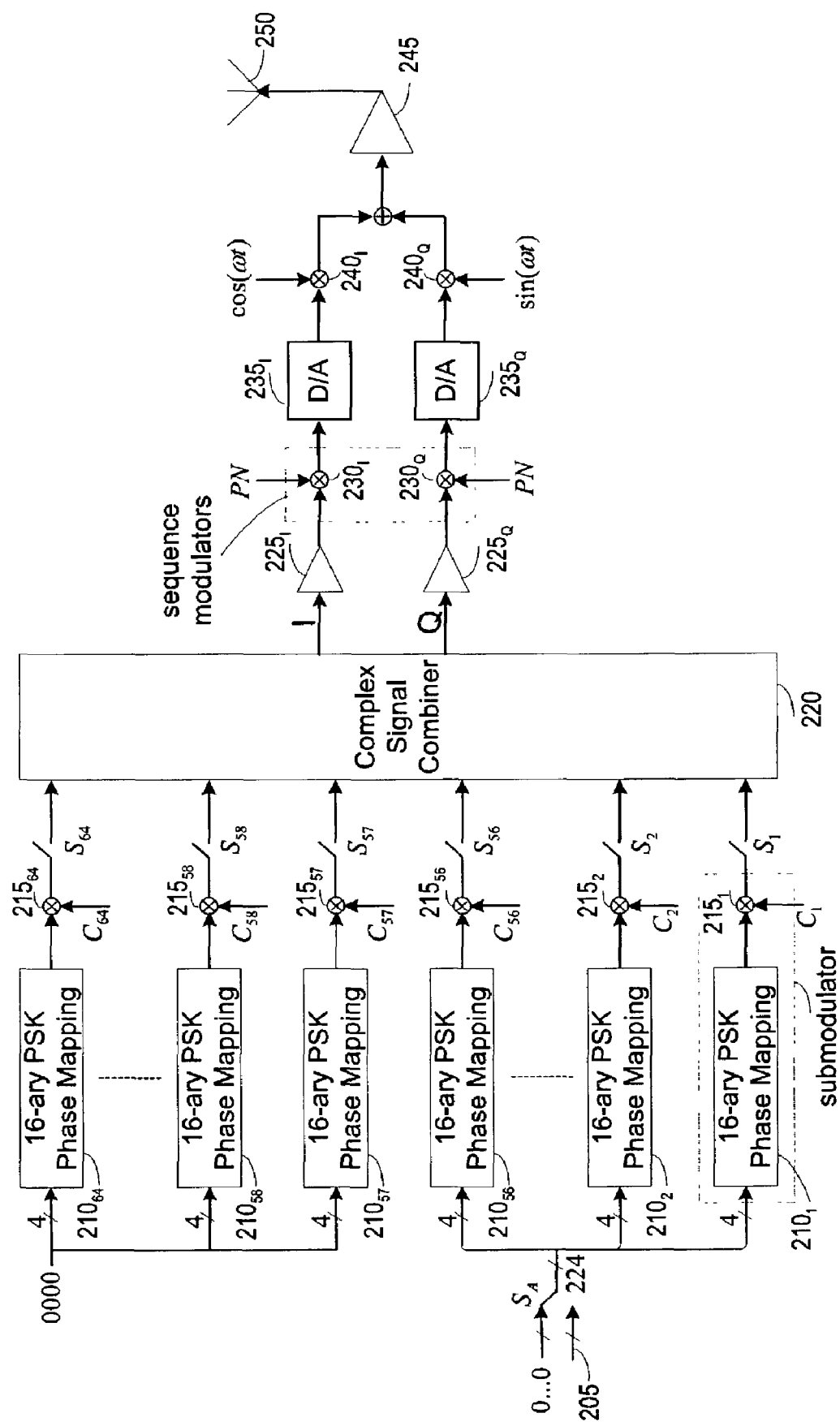
FIG. 2 is a block diagram schematically showing the configuration of a transmitter of a multi-channel direct sequence spread spectrum communication system according to the first embodiment of the invention.

FIG. 2 illustrates a transmitter of a multi-channel direct sequence spread-spectrum communications system according to the first embodiment of the invention. Before describing the function of each component, it may be helpful to have an overall picture first.

There are 64 spreading codes denoted by $C_1$ to $C_{64}$ and there are 64 channels each corresponding to one of the 64 spreading codes. The channels corresponding to spreading codes $C_{57}$ to $C_{64}$ are only used for signaling and called signaling channel for these channels will be shut off during normal data transmission. The channels corresponding to spreading codes $C_1$ to $C_{56}$ are called data channels because these channels are mainly for data transmission even they may be used for setting up AGC and assisting signaling.

The channel corresponding to spreading code $C_i$ is called channel i, where $1 \leq i \leq 64$.

The transmitter can transmit with its maximum transmission rate at 224 bits per symbol period when all of the 56 data channels are used for data transmission and when there is no symbol repetition in transmission. If there are some symbol repetitions, or if only part of the 56 data channels will be used for transmission, then a fraction of the maximum transmission rate is possible and therefore provides many different transmission rates.

A switch controls whether a channel is on or off. There is a switch with each of 64 channels. When a switch is close, the signal generated by the corresponding channel is sent to the complex signal combiner 22O and therefore the channel is on. When the switch is open, the signal generated by the corresponding channel is not sent to the complex signal combiner 22O and therefore the channel is off.

Usually there are more active channels in a normal data transmission section than in a signaling section in order to provide more solid initial synchronization and obtain better estimation on channel condition as well as normal data transmission rate.

A multi-channel AGC symbol could be any multi-channel symbol as long as the multi-channel AGC symbol is not identical to any of the possible multi-channel signaling symbols and any of the possible multi-channel data symbols. In this example, one can take the symbols generated by all 64 channels in a symbol period as a multi-channel AGC symbol.

A multi-channel signaling symbol consists of symbols generated by at least one of the 8 signaling channels and exactly one symbol from one of the 56 data channels.

A different number of symbol transmissions is assigned to each of the 8 dedicated signaling symbols. For example, one can assign $2^0=1$ transmission to the dedicated signaling symbol generated by $channel_{57}$, $2^1=2$ transmissions to the dedicated signaling symbol generated by $channel_{58}$, $2^2=4$ transmissions to the dedicated signaling symbol generated by channel $_{59}$, . . . , and $2^7=128$ transmissions to the dedicated signaling symbol generated by $channel_{64}$. The combinations of 8 dedicated signaling symbols can provide $2^8-1=255$ different transmissions. For example, when $channel_{57}$, $channel_{58}$, and $channel_{59}$ are on and the rest signaling channels are off, then each of the data symbols will be transmitted $2^0+2^1+2^2=7$ times.

During signaling periods, one and only one of the data channels is on. If a particular data channel is on during signaling periods, then all the data channels whose channel index are smaller than the index of that particular channel will be on during normal data transmission. For example, during signaling period, among the 56 data channels, if only channel 15 is on, then during normal data transmission, the channel 1 to channel 15 will be used to transmit data.

The combinations of 8 signaling channels and the selections of 56 data channels can provide 255×56=14,280 different transmission modes.

After signaling period, a series of multi-channel data symbols will be transmitted. A multi-channel data symbol is the combination of symbols generated by each of the active data channels.

Now it is time for detail description of each element in FIG. 2.

The switch $S_A$ is connected to 224 bits with each bit set to 0 during AGC period and signaling period. During data transmission period, the switch $S_A$ is connected to the input data bus 205. The 224 data bits on bus 205, through switch $S_A$, are separated into 56 groups with each group having 4 bits. In case only part of 56 channels will be used for transmission, the bits corresponding to the inactive channels can be filled with bit 0. Each group of 4 bits is fed to one of the 56 16-ary PSK phase mapping devices labeled as $210_1$ to $210_{56}$. There are 8 16-ary PSK phase mapping devices corresponding to 8 signaling channels. Each of the 8 16-ary PSK phase mapping devices has 4 bits 0000 as its input.

Every symbol generated by each 16-ary PSK mapping device is called a base symbol. Every sequence of base symbols from each 16-ary PSK mapping device is called a base signal.

A 16-ary PSK phase mapping device maps its 4-bit input into a complex number corresponding the one of the 16 phases. The output of each of the 64 16-ary PSK phase mapping devices will be multiplied by a corresponding spreading code from $C_1$ to $C_{64}$ at the multipliers $215_1$ to $215_{64}$ respectively. When a particular channel is used, the corresponding switch will close. Each of the 64 switches $S_1$ to $S_{64}$ will determine if the output of a corresponding multiplier will be fed to a complex signal combiner device 220. All the signals fed to complex signal combiner device 220 will be summed up.

Every base symbol modulated by a spreading code is called a spread spectrum symbol. Every sequence of spread spectrum symbol is called a spread spectrum signal.

The output of the complex signal combiner 220 is separated into real signal I and imagery signal Q. The I and Q signals are scaled by the scalers $225_I$ and $225_Q$ to obtain the scaled I and Q signals respectively. The purpose of the scalers $225_I$ and $225_Q$ is to make proper scaling so that the transmitting power will not be changed with different number of active channels. Usually the scalers $225_I$ and $225_Q$ have identical gains.

The scaled I signal is multiplied by a PN code or a scramble code or a cover code at multiplier $230_I$ and then is converted into an analog signal by a digital to analog converter (DAC) $235_I$. The converted I signal is further modulated by $\cos(\omega t)$ at multiplier $240_I$. Similarly, The scaled Q signal is multiplied by the same PN code or the same scramble code or the same cover code at multiplier $230_Q$ and then is converted into an analog signal by another digital to analog converter (DAC) $235_Q$. The converted Q signal is further modulated by $\sin(\omega t)$ at multiplier $240_Q$. The signals from both I and Q paths are coupled together and go through a power amplifier 245 and then through antenna 250 to transmit.

Figure 3:
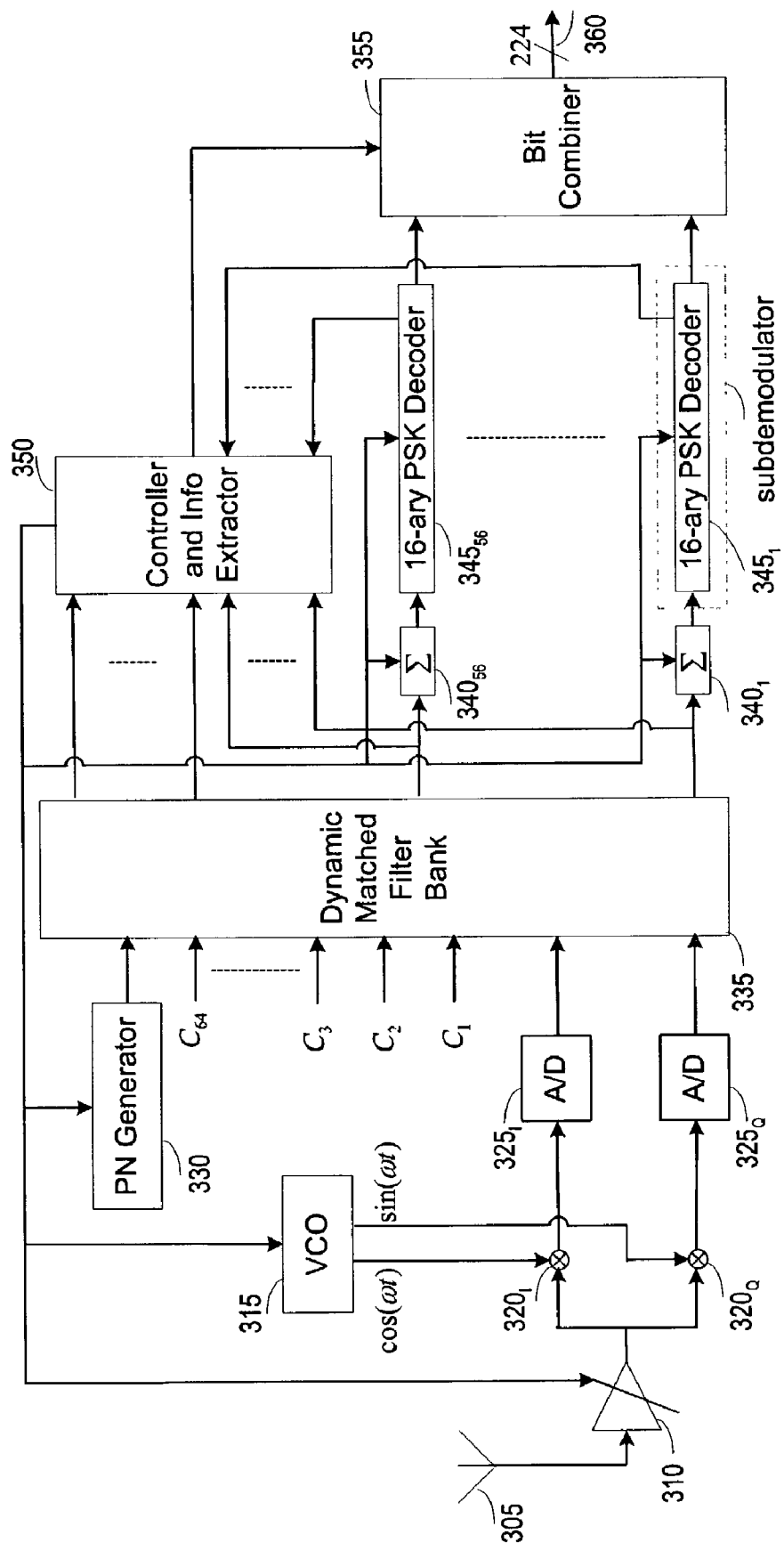
FIG. 3 is a block diagram schematically showing the configuration of a receiver of a multi-channel direct sequence spread spectrum communication system according to the first embodiment of the invention.

FIG. 3 illustrates a receiver of a multi-channel direct sequence spread-spectrum communications system according to the first embodiment of the invention.

The signal enters the receiving antenna 305 and goes through a gain controllable amplifier 310. There are $\cos(\omega t)$ and $\sin(\omega t)$ from the outputs of voltage controlled oscillator (VCO) 315. The signal from the gain controllable amplifier 310 is multiplied at multiplier $320_I$ by $\cos(\omega t)$ and multiplied at multiplier $320_Q$ by $\sin(\omega t)$. The outputs of multiplier $320_I$ and multiplier $320_Q$ are fed to analog to digital converters (ADC) $325_I$ and $325_Q$ to obtain digital I and Q signals respectively.

Both the digital I and Q signals from outputs of analog to digital converters $325_I$ and $325_Q$ are sent to dynamic matched filter bank 335, which also takes the spreading codes $C_1$ to $C_{64}$ and the PN code generated by PN generator 330 as its inputs.

When each of the reference signals at any symbol period is identical to the signal at its previous period, a group of regular matched filters, or a regular matched filter bank, can be used to find how closely the received signal matches to each of the reference signals. However, when at least one of the reference signals at some symbol period is not identical to the signal at its pervious symbol period, then a dynamic matched filter bank is used to find how closely the received signal matches to each of the reference signals. In the example given by FIG. 2, if the period of the PN signal is longer than a symbol period, then the reference signals consisting of 64 spreading codes scrambled by the PN signal do change over each symbol period and therefore, a dynamic matched filter bank should be used.

There are 64 outputs from dynamic matched filter bank 335 with each output being a signal of a complex number. During an AGC period and a signal period, all the output will be sent to the controller and information extractor 350. The purpose of the controller and information extractor 350 is to find the information such as the set of active data channels and symbol repetition contained in the signaling symbols. The phase information contained in a preamble signal or mid-amble signal can be used for initializing a rake structure, establishing initial synchronization, and generating various control signals.

During normal data transmission, the receiver can further extract the information from a multi-channel data signal to re-estimate the phase offset, adjust AGC, and update multipath profiles.

The outputs of dynamic matched filter bank 335, with index 1 to 56, will sent to accumulators $340_1$ to $340_{56}$ respectively and will be accumulated a fixed number of times determined by the information extracted from multichannel signaling symbols by 350. The output of accumulators $340_1$ to $340_{56}$ will be sent to 56 16-ary PSK decoders $345_1$ to $345_{56}$ to decode. The bit combiner 355 will merge all the bits from the 56 16-ary PSK decoders $345_1$ to $345_{56}$ together.

Figure 4:
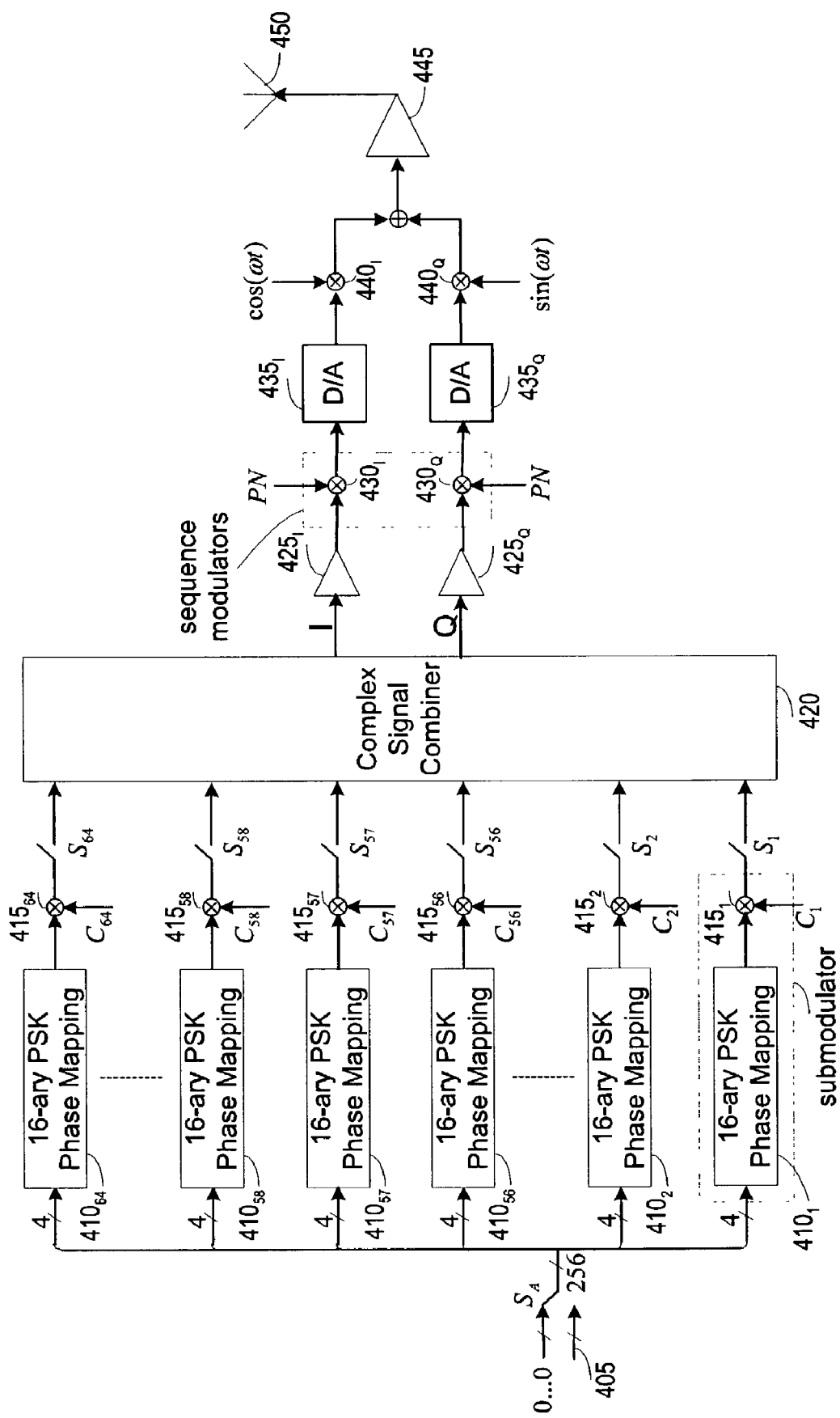
FIG. 4 is a block diagram schematically showing the configuration of a transmitter of a multi-channel direct sequence spread spectrum communication system according to the second embodiment of the invention.

FIG. 4 illustrates a transmitter of a multi-channel direct sequence spread-spectrum communications system according to the second embodiment of the invention.

The transmitter in FIG. 4 is similar to the transmitter in FIG. 2 and a device in FIG. 4 is just like the corresponding device in FIG. 2. The difference between FIG. 4 and FIG. 2 is that in FIG. 4, the input data bus 405 has 256 bits instead of 224 bits, and through switch $S_A$, is divided into 64 groups instead of 56 groups. Each of the 64 groups is connected to a corresponding channel from channel 1 to channel 64.

Again assume that $C_1$ to $C_{56}$ are the 8 signaling channels. In order to support higher data rate, the 8 signaling channels will be also used for data transmission and therefore they are data channels. When there are less than 56 active data channels, one can construct signaling symbol just in the way described before. When there is a need for more than 56 active channels, one can further request that no symbol repetition is allowed and during signaling periods, the only active channel is the channel having the highest index among all active data channels. For example, in order to have 60 active data channels, for 60 is larger than 56, one could set channel 60 active and shut off the rest channels during signaling periods and transmit channel 1 to channel 60 during data periods.

In order to have a multi-channels AGC symbol being different from either any of multi-channel signaling symbols or any of the multi-channel data symbols, a multi-channels AGC symbol could be the multi-channel symbols generated by all the channels except channel 1.

Figure 5:
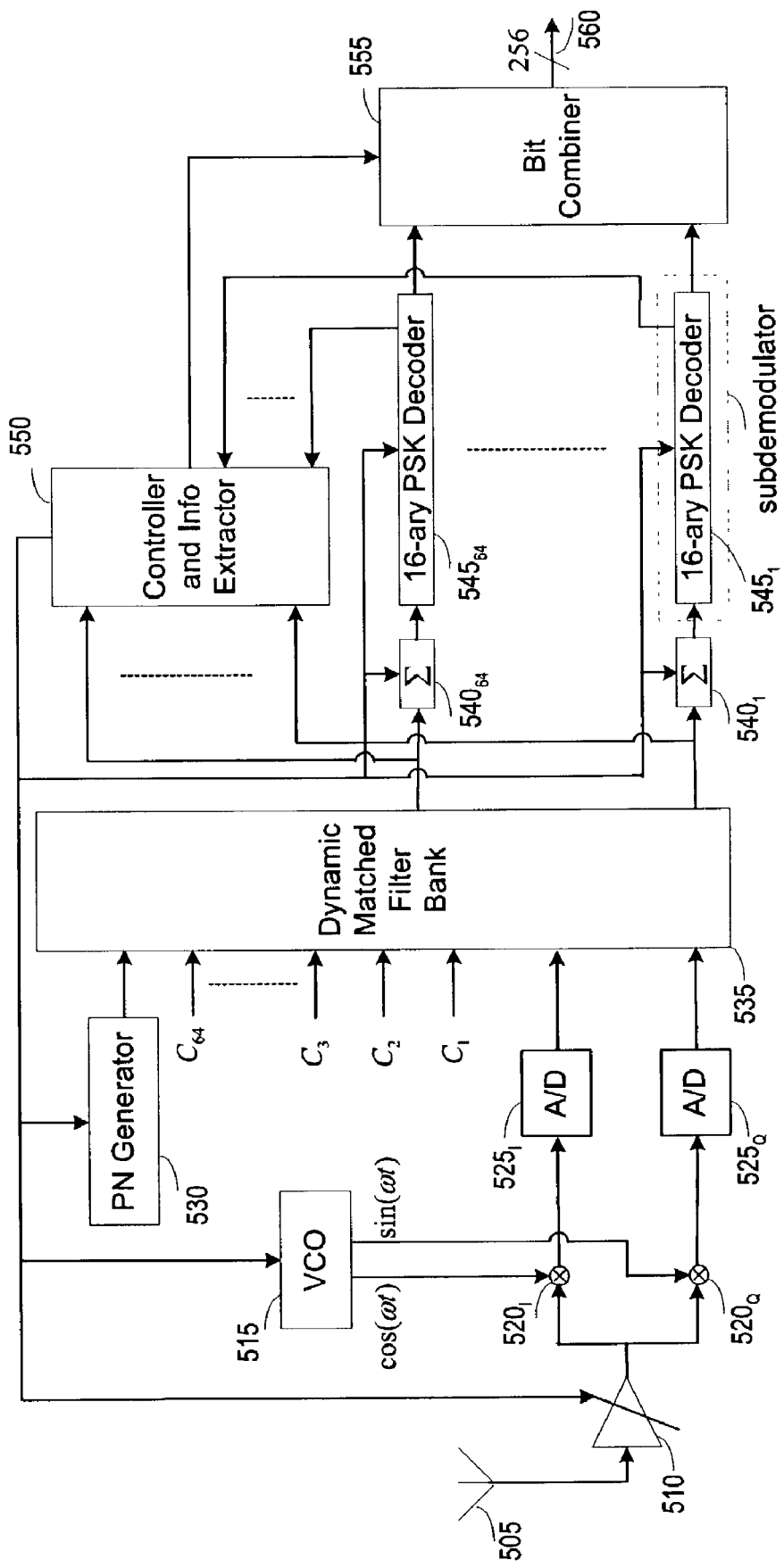
FIG. 5 is a block diagram schematically showing the configuration of a receiver of a multi-channel direct sequence spread spectrum communication system according to the second embodiment of the invention.

FIG. 5 illustrates the receiver of a multi-channel direct sequence spread-spectrum communications system according to the second embodiment of the invention. It is corresponding to the transmitter in FIG. 4. A device is FIG. 5 is just like the corresponding device in FIG. 3. The only difference is that instead of having just 56 accumulators and 56 16-ary PSK decoders as in FIG. 3, there are 64 accumulators and 64 16-ary PSK decoders. Also the bit combiner has an output of 256 bits instead of 224 bits.

What is claimed is:

1. A multi-channel spread spectrum communication system with a plurality of spreading codes used in a same frequency band for providing multi-rate transmission and supporting automatic rate detection during a transmission session, wherein each spreading code creates a communication channel, wherein said transmission session includes a signaling transmission section and a data transmission section, said system comprising:

a transmitter subsystem, said transmitter subsystem including, a bit separator for separating a block of data bits into a plurality of sub-blocks of data bits with each sub-block of data bits to be transmitted through a respective communication channel;

a plurality of sub-modulators with each sub-modulator receiving a corresponding sub-block of data bits from said bit separator, mapping said corresponding sub-block of data bits into a base symbol, and modulating said base symbol by a spreading code corresponding to a particular communication channel to generate a spread spectrum symbol for said particular communication channel;

a plurality of switches with each switch connected to a corresponding sub-modulator for turning on and shutting off a corresponding communication channel with number of active channels in said data transmission section as least same as number of active channels in said signaling transmission section; and a signal combiner connected to said plurality of switches for combining a plurality of spread spectrum symbols to generate a multi-channel spread spectrum symbol; and a receiver subsystem, said receiver subsystem including, a detection device, receiving a multi-channel spread spectrum signal, for projecting said multi-channel spread spectrum signal on each of said plurality of spreading codes, wherein said multi-channel spread spectrum signal bears information carried by said multi-channel signaling signal and information carried by said multi-channel data signal;

an information extractor, connected to said detection device, for finding information corresponding to said multi-channel signaling signal about said plurality of active data channels and said symbol repetition;

a plurality of accumulators, connected to said detection device, for integrating energy on each of said plurality of active data channels for an interval defined by said symbol repetition;

a plurality of sub-demodulators for demodulating signals accumulated on said plurality of accumulators to generate a plurality of recovered sub-blocks of data bits;

a bit combiner for combining each recovered sub-block of data bits from a corresponding sub-demodulator to generate a recovered block of data bits; and a controller for generating synchronization signals for said plurality of accumulators, said plurality of sub-demodulators, and said bit combiner;

whereby said transmitter subsystem transmits a multi-channel signaling signal during said signaling transmission section by a channel combination selected from a plurality of channel combinations for indicating a plurality of active data channels and symbol repetition to be used by a multi-channel data signal in said data transmission section;

wherein said multi-channel signaling signal consists at least a multi-channel signaling symbol, wherein said multi-channel data signal consists at least a multi-channel data symbol;

whereby said transmitter subsystem determines said plurality of active data channels and said symbol repetition for said data transmission section according to channel conditions and amount of input data;

whereby said transmitter subsystem generates a multi-channel signaling symbol according to said plurality of active data channels, said symbol repetition, and a predefined scheme;

whereby said transmitter subsystem transmits said block of data bits as a multi-channel data symbol through said plurality of active data channels with said multi-channel data symbol retransmitted by said symbol repetition;

wherein said predefined scheme specifies a relationship between allocation of active channels for signaling data transmission and allocation of active channels and number of symbol repetition for conducting data transmission;

whereby said receiver subsystem determines said plurality of active data channels and said symbol repetition through said information extractor according to said predefined scheme, accumulates energy on each of said plurality of active data channels for a period defined by said symbol repetition;

whereby said receiver subsystem uses information collected from said multi-channel signaling signal to set up initialize synchronization; and whereby said receiver subsystem demodulates said plurality of active data channels, and then combines said plurality of recovered sub-blocks of data bits together.

2. The multi-channel spread spectrum communication system as in claim 1, wherein each of sub-modulators comprises an M-ary phase-shift-keying circuit for mapping a corresponding sub-block of data bits into a complex signal representing one of M-ary phases and a multiplier multiplying said complex signal with a corresponding spreading code.

3. The multi-channel spread spectrum communication system as in claim 1, wherein each of sub-modulators comprises an M-ary quadrature amplitude modulation circuit for mapping a corresponding sub-block into a complex signal representing one of M-ary quadrature-amplitude-modulation signals and a multiplier multiplying said complex signal with a corresponding spreading code.

4. The multi-channel spread spectrum communication system as in claim 1, wherein each of sub-modulators comprises an M-ary pulse amplitude modulation circuit for mapping a corresponding sub-block into a signal representing one of M-ary pulse amplitude modulation signals and a multiplier multiplying said signal with a corresponding spreading code.

5. The multi-channel spread spectrum communication system as in claim 1, wherein a detection device comprises a plurality of items selected from a group consisting of a plurality of matched-filters and a plurality of correlators with each of said plurality of items for obtaining a correlation between a received multi-channel spread spectrum signal and a corresponding spreading code.

6. The multi-channel spread spectrum communication system as in claim 1, wherein a detection device comprises a plurality of items selected from a group consisting of a plurality of matched-filters and a plurality of correlators with each of said plurality of items for obtaining a correlation between a received multi-channel spread spectrum signal and a corresponding spreading code scrambled by a scrambling code.

7. The multi-channel spread spectrum communication system as in claim 1, wherein each of sub-demodulators comprises an M-ary phase-shift-keying demodulator for obtaining a phase signal from a multi-channel spread spectrum signal projected on a corresponding channel and then reversely mapping said phase signal into a sub-block of data bits.

8. The multi-channel spread spectrum communication system as in claim 1, wherein each of sub-demodulators comprises an M-ary quadrature amplitude modulation demodulator for obtaining information of real and imaginary magnitudes from a multi-channel spread spectrum signal projected on a corresponding channel and then reversely mapping said information into a sub-block of data bits.

9. The multi-channel spread spectrum communication system as in claim 1, wherein each of sub-demodulators comprises an M-ary pulse amplitude modulation demodulator for obtaining magnitude information from a multi-channel spread spectrum signal projected on a corresponding channel and then reversely mapping said magnitude information into a sub-block of bits.

10. The multi-channel spread spectrum communication system as in claim 1 further comprising a scaler for keeping average total transmitting power during signal periods and during data periods approximately same.

11. The multi-channel spread spectrum communication system as in claim 1, wherein said receiver subsystem further comprises means for conducting phase-offset estimation, means for searching for multi-paths, means for estimating magnitudes and relative delays of each multi-path, and means for combining energy scattered in multi-paths according to information obtained through said information extractor.

12. A multi-channel spread spectrum communication system for providing automatic rate detection and solid initial synchronization between a transmitter and a receiver, said system providing a plurality of signaling periods and a plurality of data periods for indicating a desired data transmission rate and conducting data transmission respectively between said transmitter and said receiver, said system comprising:

a stream separator for dividing an input data stream signal into a plurality of data sub-stream signals;

a plurality of mapping circuits, wherein a respective mapping circuit, coupled to receive a corresponding data sub-stream signal from said stream separator, maps a predetermined-length segment of said corresponding data sub-stream signal into a base signal, wherein each base signal consists of a plurality of base symbols;

a plurality of multipliers, wherein a respective multiplier is for modulating a corresponding base signal by a corresponding spreading code to generate a spread spectrum signal for a corresponding communication channel, wherein each spread spectrum signal consists of a plurality of spread spectrum symbols;

a plurality of switches, wherein a respective switch is for controlling on and off of a corresponding communication channel;

a signal combiner, receiving a plurality of spread spectrum signals from said plurality of switches, for combining said plurality of spread spectrum signals into a multi-channel spread spectrum signal;

a scaler for scaling said multi-channel spread spectrum signal to generate a scaled multi-channel spread spectrum signal with approximately same signal strength during both said plurality of signaling periods and said plurality of data periods according to number of active signaling channels and number of active data channels; and a plurality of sub-demodulators, wherein a respective sub-demodulator is for demodulating a corresponding spread spectrum signal borne in a received multi-channel spread spectrum signal to generate a recovered data sub-stream signal;

whereby during said plurality of signaling periods, said transmitter determines said desired data transmission rate according to channel conditions and amount of input data by specifying a plurality of active data channels and a number of symbol repetition to be used in said pluralities of data periods, and generates a multi-channel spread spectrum signaling signal by selecting a channel combination from a plurality of channel combinations according to said plurality of active data channels, said symbol repetition, and a predefined scheme;

wherein said predefine scheme specifies an agreement between said transmitter and said receiver on relationship among active data channels, symbol repetition number, and active signaling channels;

whereby during said plurality of data periods, said transmitter combines a plurality of selected spread spectrum data signals into a multi-channel spread spectrum data signal with each corresponding spreading code modulating on a corresponding base signal and with each base symbol repeated by said number of symbol repetition;

whereby during said plurality of signaling periods, said receiver extracts information about said plurality of active data channels and said symbol repetition from a received multi-channel spread spectrum signaling signal by accumulating energy for each signaling channel over said plurality of signaling periods, determining a plurality of active signaling channels, and comparing said plurality of active signaling channels with said predefine scheme;

whereby during said plurality of signaling periods, said receiver establishes initial synchronization by estimating phase offset from said received multi-channel spread spectrum signaling signal and during said plurality of data periods, said receiver adjusts phase offset estimation from said multi-channel spread spectrum data signal; and whereby said receiver recovers said input data stream signal by letting each sub-demodulator corresponding to an active data channel demodulate a received multi-channel spread spectrum signal to generate a recovered data sub-stream signal corresponding to said active data channel and then combining a plurality of recovered data sub-stream signals together.

13. The multi-channel spread spectrum communication system as in claim 12, further comprising a plurality of sequence modulators for modulating said multi-channel spread spectrum signal with a sequence from a sequence group consisting of scramble codes, signature codes, and PN codes.

14. The multi-channel spread spectrum communication system as in claim 12, wherein each base signal consists of an in-phase signal and a quadrature signal, wherein each spread spectrum signal consists of an in-phase spread spectrum signal and a quadrature spread spectrum signal, wherein said multi-channel spread spectrum signal consists of an in-phase multi-channel spread spectrum signal and a quadrature multi-channel spread spectrum signal, said system further comprising a radio frequency modulator for modulating in-phase multi-channel spread spectrum signal with an in-phase carrier, for modulating quadrature multi-channel spread spectrum signal with a quadrature carrier, and for comprising a radio frequency demodulator for demodulating a received multi-channel spread spectrum signal with a local in-phase carrier and a local quadrature carrier.

15. The multi-channel spread spectrum communication system as in claim 12, further comprising a plurality of code detection devices selected from a group consisting of matched filters and correlators.

16. An automatic rate detection method in a multi-channel communication system during a transmission session, wherein said transmission session includes a signaling transmission section and a data transmission section, wherein said system has a plurality of channels available for said transmission session, said method comprising:

means for determining a plurality of active data channels selected from said plurality of channels and a number of symbol repetition to be used in said data transmission section according to channel conditions;

means for determining a plurality of active signaling channels selected from said plurality of channels according to said plurality of active data channels and said number of symbol repetition and a predefined scheme, wherein said predefined scheme specifies different signaling channel assignments for different active data channels and different symbol repetitions;

means for generating a multi-channel signaling signal during said transmission signaling section by turning on each active signaling channel and transmitting said plurality of active signaling channels simultaneously;

means for separating a block of data bits into a plurality of sub-blocks of data bits;

means for generating a multi-channel data signal during said transmission data section by turning on each active data and transmitting said plurality of active data channels simultaneously by said number of symbol repetition;

means for demodulating each active signaling channel during said signaling transmission section;

means for demodulating each active data channel during said data transmission section;

means for identifying said plurality of active data channels and said number of symbol repetition from a received multi-channel signaling signal according to said predefined scheme during said signaling transmission section; and means for demodulating a received multi-channel data signal by demodulating each active data channel and combining a plurality of recovered sub-blocks of data bits with each recovered sub-block produced from a corresponding active data channel.

17. The automatic rate detection method in a multi-channel communication system as in claim 16, further comprising means for conducting phase-offset estimation, means for establishing multi-path profile from a received multi-channel signaling signal, and means for combining energy scattered in multi-paths.

18. The automatic rate detection method in a multi-channel communication system as in claim 17, further comprising:

means for scrambling said multi-channel signaling signal to generate a scrambled multi-channel signaling signal;

means for scrambling said multi-channel data signal to generate a scrambled multi-channel data signal;

means for descrambling said scrambled multi-channel signaling signal;

means for descrambling said scrambled multi-channel data signal; and means for generating controlling signal to synchronize said means for demodulation, said means for conducting phase-offset estimation, said means for establishing multi-path profile, and said means for combining energy scattered in multi-paths.

19. The automatic rate detection method in a multi-channel communication system as in claim 16, wherein said system comprises a scaler for scaling a multi-channel signal, said system further comprising means for determining gains of said scaler to keep said multi-channel signaling signal and said multi-channel data signal have a predefined ratio on average transmission power.

20. The automatic rate detection method in a multi-channel communication system as in claim 16, wherein said system is a multi-channel direct sequence spreading spectrum communication system with a plurality of spreading codes and a scrambling code, said method further comprising means for mapping a sub-block of data bits into a base signal, means for spreading said base signal by a corresponding spreading code to generate a spread signal, means for combining a plurality of spread signals to generate a multi-channel spread spectrum signal, and means for descrambling said multi-channel spread spectrum signal.

* * * * *